US012026683B2

(12) United States Patent
Varagani et al.

(10) Patent No.: US 12,026,683 B2
(45) Date of Patent: Jul. 2, 2024

(54) SYSTEM AND METHOD FOR RISK ASSESSMENT OF A THIRD PARTY APPLICATION FOR CONTROLLING COMPETITIVE MIGRATION

(71) Applicants: Venkata Nagabhushan Rao Varagani, Bangalore (IN); Sudeep Gangadharan, Bangalore (IN)

(72) Inventors: Venkata Nagabhushan Rao Varagani, Bangalore (IN); Sudeep Gangadharan, Bangalore (IN)

(73) Assignee: Intuit Inc., Mountain View, CA (US)

( * ) Notice: Subject to any disclaimer, the term of this patent is extended or adjusted under 35 U.S.C. 154(b) by 874 days.

(21) Appl. No.: 15/691,565

(22) Filed: Aug. 30, 2017

(65) Prior Publication Data
US 2019/0005467 A1   Jan. 3, 2019

(30) Foreign Application Priority Data
Jun. 30, 2017   (IN) .............................. 201731023153

(51) Int. Cl.
| | | |
|---|---|---|
| *G06Q 20/00* | (2012.01) | |
| *G06F 16/2455* | (2019.01) | |
| *G06Q 20/02* | (2012.01) | |
| *G06Q 20/10* | (2012.01) | |
| *G06Q 20/38* | (2012.01) | |

(Continued)

(52) U.S. Cl.
CPC ......... *G06Q 20/02* (2013.01); *G06F 16/2455* (2019.01); *G06Q 20/10* (2013.01); *G06Q 20/3829* (2013.01); *G06Q 20/4016* (2013.01); *G06N 20/00* (2019.01)

(58) Field of Classification Search
USPC ......................................................... 705/39
See application file for complete search history.

(56) References Cited

U.S. PATENT DOCUMENTS

| | | | | |
|---|---|---|---|---|
| 9,386,463 | B1 * | 7/2016 | Contino | ................ H04W 24/02 |
| 9,605,319 | B2 * | 3/2017 | Stone | ..................... G16B 25/10 |
| 9,976,188 | B2 * | 5/2018 | Stone | ..................... G16B 20/10 |

(Continued)

OTHER PUBLICATIONS

Mainframe Application Modernization Patterns for Hybrid Cloud, Redbooks, 2023 (Year: 2023).*

(Continued)

*Primary Examiner* — Bruce I Ebersman
(74) *Attorney, Agent, or Firm* — Lathrop GPM LLP (57) ABSTRACT

In general, the invention relates to a method involving allowing access to a financial application by a third-party extension based on a single license to use the financial application, where the third-party extension was developed by a third-party developer using one or more tools in a software development kit (SDK) for the financial application and where the financial application stores first transaction data obtained for a first user of the financial application, monitoring operations performed on the financial application by the third-party extension to detect operations that migrate transaction data to a competitive application, using distributed computing software adjust a risk index that is associated with the third-party extension, determining that the risk index exceeds a pre-defined threshold, and controlling future access to the financial application by the third-party extension.

12 Claims, 7 Drawing Sheets

(51) Int. Cl.
*G06Q 20/40* (2012.01)
*G06N 20/00* (2019.01)

(56) References Cited

U.S. PATENT DOCUMENTS

| | | | | |
|---|---|---|---|---|
| 10,876,164 B2* | 12/2020 | Stone | ............... | C12Q 1/6886 |
| 10,954,568 B2* | 3/2021 | Stone | ............... | A61P 35/00 |
| 11,174,517 B2* | 11/2021 | Stone | ............... | C12Q 1/6886 |
| 11,473,407 B2* | 10/2022 | Tang | ............... | G06F 40/205 |
| 2004/0153663 A1* | 8/2004 | Clark | ............... | G06Q 30/0185 |
| | | | | 726/25 |
| 2013/0095459 A1* | 4/2013 | Tran | ............... | G09B 19/00 |
| | | | | 434/247 |
| 2013/0344968 A1* | 12/2013 | Halfteck | ............... | A63F 13/79 |
| | | | | 463/43 |
| 2014/0079297 A1* | 3/2014 | Tadayon | ............... | G06V 40/172 |
| | | | | 382/118 |
| 2014/0163369 A1* | 6/2014 | Nair | ............... | A61B 8/5223 |
| | | | | 600/407 |
| 2014/0201126 A1* | 7/2014 | Zadeh | ............... | A61B 5/165 |
| | | | | 706/52 |
| 2014/0317595 A1* | 10/2014 | Kilby | ............... | G06Q 10/06316 |
| | | | | 717/105 |
| 2015/0026027 A1* | 1/2015 | Priess | ............... | G06Q 20/4016 |
| | | | | 705/35 |
| 2015/0033217 A1* | 1/2015 | Mellor | ............... | H04L 63/102 |
| | | | | 717/171 |
| 2015/0065362 A1* | 3/2015 | Gyorffy | ............... | C12Q 1/6886 |
| | | | | 506/8 |
| 2015/0066577 A1* | 3/2015 | Christiansen | ............... | G06Q 10/06 |
| | | | | 705/7.28 |
| 2015/0125832 A1* | 5/2015 | Tran | ............... | G09B 5/00 |
| | | | | 434/127 |
| 2017/0163631 A1* | 6/2017 | Brucker | ............... | H04L 63/101 |
| 2017/0251013 A1* | 8/2017 | Kirti | ............... | H04L 63/1441 |
| 2018/0219888 A1* | 8/2018 | Apostolopoulos | ............... | H04L 63/1425 |
| 2018/0314808 A1* | 11/2018 | Casey | ............... | G06F 21/105 |
| 2019/0018661 A1* | 1/2019 | Srinivasan Natesan | ............... | G06N 20/00 |

OTHER PUBLICATIONS

Planning and Managing the Deployment of WebSphere Commerce, Redbooks 2008 (Year: 2008).*

* cited by examiner

SYSTEM AND METHOD FOR RISK ASSESSMENT OF A THIRD PARTY APPLICATION FOR CONTROLLING COMPETITIVE MIGRATION

CROSS-REFERENCE TO RELATED APPLICATIONS

This non-provisional patent application claims priority to Indian Patent Application No. 201731023153, filed on Jun. 30, 2017 in the Indian Intellectual Property Office, under 35 U.S.C. § 119(a). The entire contents of the Indian Patent Application No. 201731023153 are hereby incorporated by reference.

BACKGROUND

Platform developers often bundle tools for creating applications for a platform into a software development kit (SDK). Application developers also often make SDKs available so that third-party developers can create extensions to an application, including extensions that are apps capable of executing on mobile devices which access an application online.

To prevent an SDK from being misused, many platform and application developers require applications or extensions to be submitted for certification before sale to end users. Other platform and application developers permit sale to end users without certification and take remedial action such as denying access if the SDK is misused. The latter approach: (a) avoids the time and expense of certification; (b) inherently prevents any unfair discrimination by certifiers; and (c) facilitates applications or extensions being delivered to end users more quickly.

One form of misuse involves an extension to an application that migrates an end user's data to a competitive product or service, in violation of an end user license agreement (EULA) for the SDK and/or the application. Consequently, detection of such misuse remains an ongoing area of research and experimentation.

SUMMARY

In general, in one aspect, the invention relates to a method, comprising operations of allowing access to a financial application by a third-party extension based on a single license to use the financial application, wherein the third-party extension was developed by a third-party developer using one or more tools in a software development kit (SDK) for the financial application and wherein the financial application stores first transaction data obtained for a first user of the financial application; monitoring operations performed on the financial application by the third-party extension to detect operations that migrate transaction data to a competitive application; using distributed computing software adjust a risk index that is associated with the third-party extension; determining that the risk index exceeds a pre-defined threshold; and controlling future access to the financial application by the third-party extension.

In general, in one aspect, the invention relates to a non-transitory computer-readable storage medium configured to store a program, wherein the program, when executed, performs operations to: allow access to a financial application by a third-party extension based on a single license to use the financial application, wherein the third-party extension was developed by a third-party developer using one or more tools in a software development kit (SDK) for the financial application and wherein the financial application stores first transaction data obtained for a first user of the financial application; monitor operations performed on the financial application by the third-party extension to detect operations that migrate transaction data to a competitive application; use distributed computing software adjust a risk index that is associated with the third-party extension, wherein the risk index is based at least in part on the monitored operations; determine that the risk index exceeds a pre-defined threshold; and control future access to the financial application by the third-party extension.

In general, in one aspect, the invention relates to a system, comprising: a hardware processor and memory; software instructions stored in the memory and configured to execute on the hardware processor, which, when executed cause the hardware processor to: allow access to a financial application by a third-party extension based on a single license to use the financial application, wherein the third-party extension was developed by a third-party developer using one or more tools in a software development kit (SDK) for the financial application and wherein the financial application stores first transaction data obtained for a first user of the financial application; monitor operations performed on the financial application by the third-party extension; use distributed computing software adjust a risk index that is associated with the third-party extension, wherein the risk index is based at least in part on the monitored operations; determine that the risk index exceeds a pre-defined threshold; and control future access to the financial application by the third-party extension.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or proceed) the second element in an ordering of elements.

In general, one or more embodiments of the invention involve detecting misuse of a financial application's SDK by a third-party application, where the misuse is using the SDK to migrate a user's transaction data to a competitor. Once the misuse is detected, various remedies might be pursued, including denying the third-party application access to the financial application. Through these embodiments, the invention enables the creation of extensions to an application without resorting to costly certification procedures and ultimately delivers extensions to end users more quickly.

More specifically, in one or more embodiments of the invention, a financial service develops a software development kit (SDK) for a financial application that is available to third-party developers. The financial application stores transaction data obtained for its users. The SDK includes one or more tools that enable development of an extension to the financial application. The financial service then allows access to the financial application by a third-party extension. The financial service monitors the operations performed on the financial application by the third-party extension, looking for indications that the third-party is migrating user transaction data to a competitor. Based on the monitored operations, the financial service updates a risk index that is associated with the third-party extension. If the risk index exceeds a pre-defined threshold, the financial service controls future access to the financial application by the third-party extension and might even deny future access.

Figure 1A:
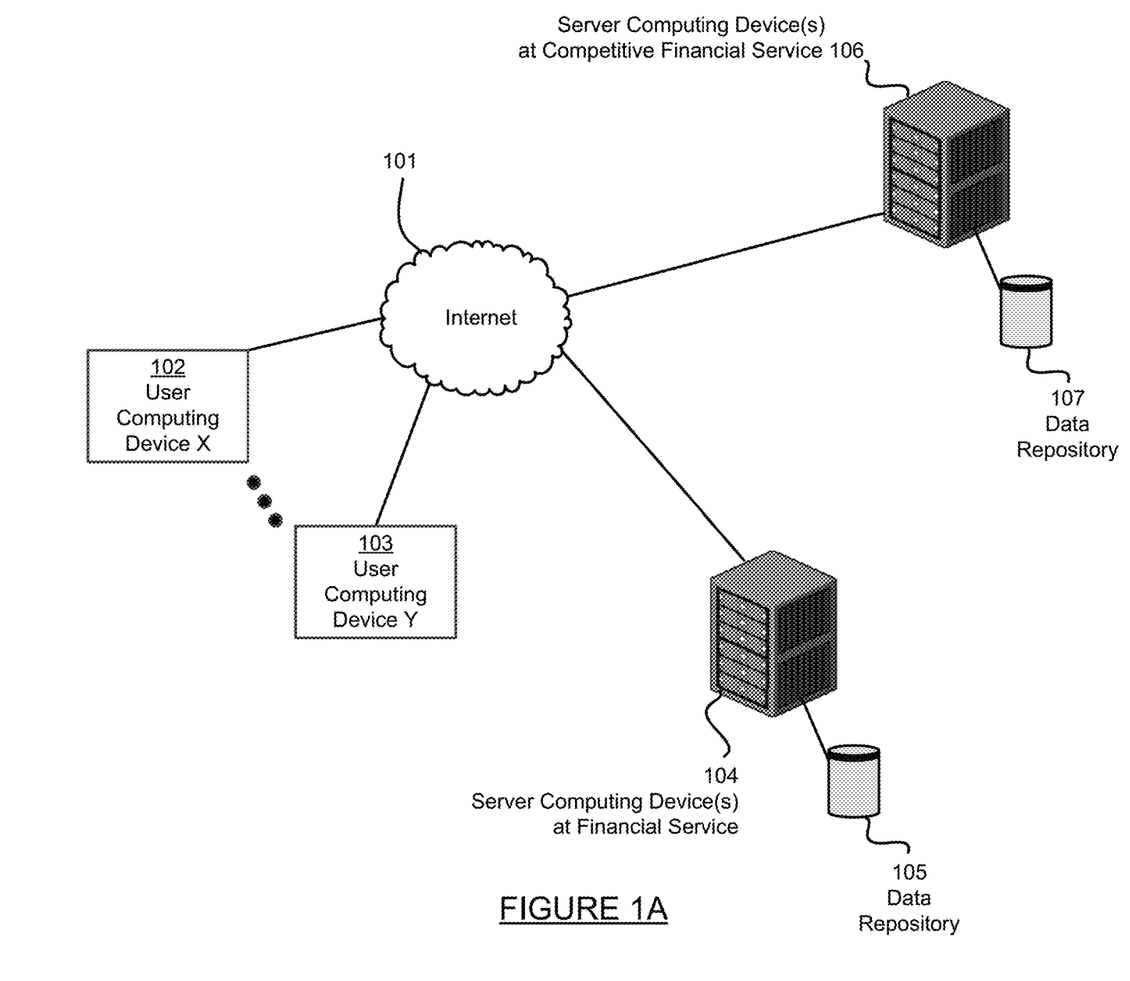
FIG. 1A is a network diagram showing a financial service and a competitive financial service, in accordance with one or more embodiments.

FIG. 1A is a network diagram showing a financial service and a competitive financial service, in accordance with an example embodiment. As depicted in this figure, user computing device X (102) (e.g., a laptop or other personal computer) and user computing device Y (103) (e.g., a mobile device such as smartphone such as an IPHONE®, ANDROID™ phone, WINDOWS® phone, etc., or a tablet computer such as an IPAD®) are connected by a network (101) (e.g., a wide area network (WAN) including the Internet, which might be wireless in part or in whole) to a financial service (104) hosting a financial application such as a multi-user online tax application that is a part of QUICKBOOK SELF-EMPLOYED™ and a competitive financial service (106). In one or more embodiments, one or both of these online financial services might be multi-user (e.g., have thousands or millions of users).

User computing device X (102) and the servers at financial service (104) and competitive financial service (106) might include hardware with one or more microprocessors (e.g., from the x86 family, the ARM family, or the PowerPC family), volatile storage (e.g., RAM), and persistent storage (e.g., flash memory, a hard disk, or a solid-state drive), and an operating system (e.g., WINDOWS®, MACOS®, LINUX®, WINDOWS SERVER™, etc.) capable of running on the hardware. Similarly, in one or more embodiments, user computing device Y (103) might include hardware with one or more microprocessors (e.g., from the ARM family or the x86 family), volatile storage (e.g., RAM), and persistent storage (e.g., flash memory such as microSD), an operating system (e.g., WINDOWS MOBILE®, ANDROID™, LINUX®, SYMBIAN OS®, etc.) that runs on the hardware, and one or more accelerometers, one or more gyroscopes, and a global positioning system (GPS) or other devices with location-identifying capability.

In one or more embodiments, financial service (104) and competitive financial service (106) might include a number of servers (e.g., racked servers) connected by a network (e.g., a local area network (LAN) or a WAN) to each other in a cluster (e.g., a load-balancing cluster, a HADOOP® cluster, a Beowulf cluster, etc.) or other distributed system which might run financial service software (e.g., web-server software, database software, etc.) and distributed-computing and/or cloud software such as Map-Reduce, Google File System, HADOOP®, HADOOP® File System, HADOOP® YARN, Hive, Dremel, CloudBase, Memcached, REDIS®, etc. The servers at financial service (104) might be connected to data repository (105). Data repository (105) might include flash memory, a redundant array of independent disks (RAID), and/or a storage area network (SAN), in one or more embodiments. Additionally or alternatively, financial service (104) and/or data repository (105) might be hosted wholly or partially in a public and/or private cloud, e.g., where the cloud resources serve as a platform-as-a-service (PaaS) or an infrastructure-as-a-service (IaaS).

Similarly, the servers at competitive financial service (106) might be connected to data repository (107) which might include flash memory, a redundant array of independent disks (RAID), and/or a storage area network (SAN), in one or more embodiments. Additionally or alternatively, competitive financial service (106) and/or data repository (107) might be hosted wholly or partially in a public and/or private cloud, e.g., where the cloud resources serve as a platform-as-a-service (PaaS) or an infrastructure-as-a-service (IaaS).

Returning to FIG. 1A, in one or more embodiments, user computing device X (102) and user computing device Y (103) might each include a browser as an application program or as part of an operating system. Examples of browsers that might execute on user computing device X (102) include INTERNET EXPLORER®, MOZILLA FIREFOX®, SAFARI®, and GOOGLE CHROME™. Examples of browsers that might execute on user computing device Y (103) include SAFARI®, MOZILLA FIREFOX®, and Android™. It will be appreciated that users of user computing device X (102) and/or user computing device Y (103) might use browsers to access financial service (104) and/or financial application (109). Additionally or alternatively, users of user computing device X (102) and/or user computing device Y (103) might use other application programs or apps to access financial service (104) and/or financial application (109).

Figure 1B:
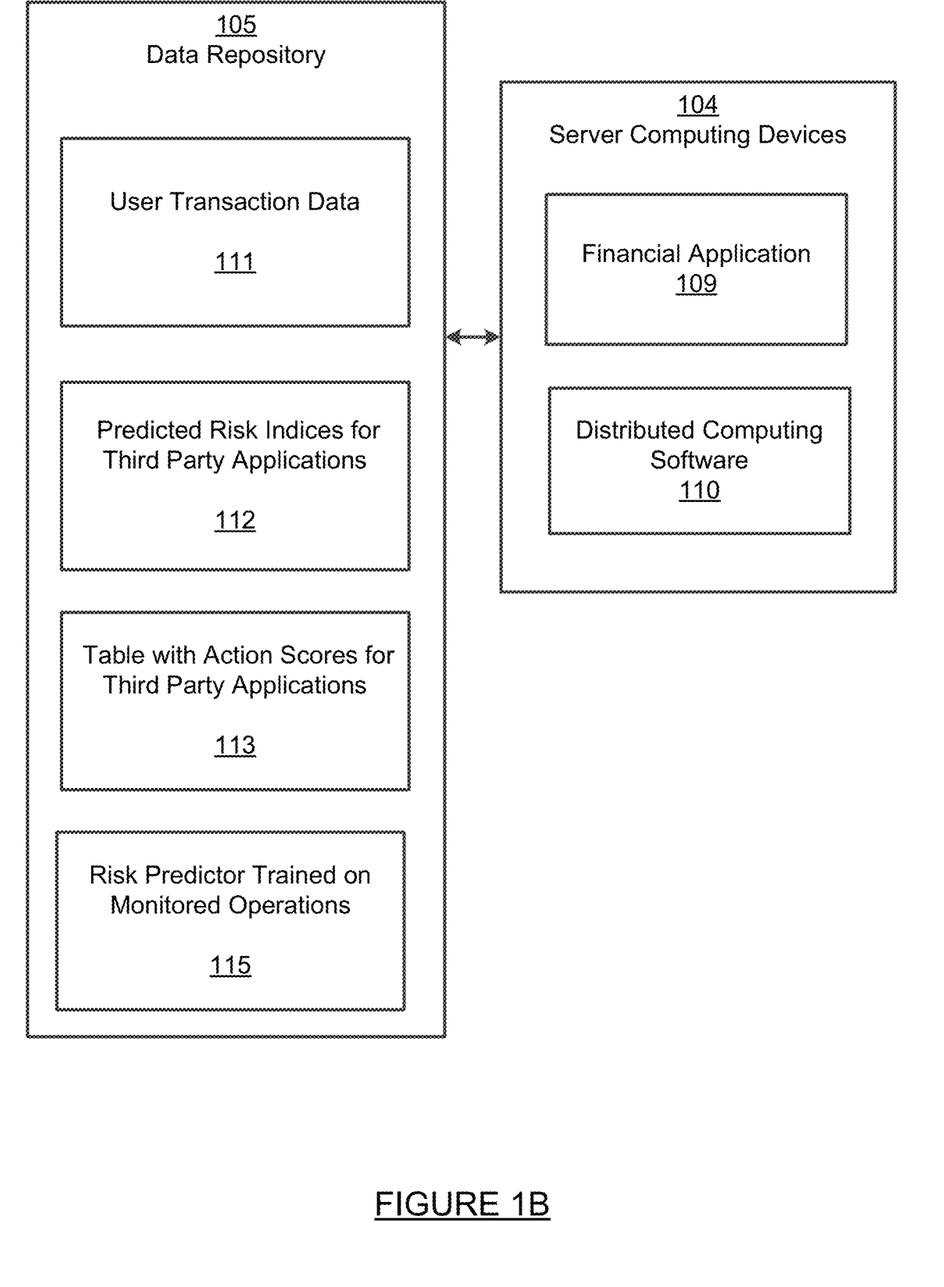
FIG. 1B is a diagram showing the data used by a process for detecting migration of user transaction data, in accordance with one or more embodiments.

In one or more embodiments, financial service (104) might use data repository (105) to store algorithms and data related to the processes described in this disclosure, as shown in FIG. 1B. More specifically, financial service (104) might use data repository (105) to store accounting and/or financial data, including accounting and/or financial data (111) related to the transactions of the users of the online financial application hosted by the servers at the financial service (104). In one or more embodiments, user transaction data (111) might include data such as transaction date and time, payment amount, merchant name, merchant location, product or service purchased, etc. In one or more embodiments, the user transaction data (111) might have been entered by a user or obtained by the financial service (104) on behalf of a user from a financial institution such as a bank or credit-card provider, e.g., using secured delegated access such as OAuth or an application programming interface (API) that supports an open financial exchange (OFX) format. Also as shown in this figure, the financial service (104) might use data repository (105) to store predicted risk indices (112) for third party applications. In one or more embodiments, a third-party application might be an app for a mobile device that accesses financial application (109) online. In one or more embodiments, such a risk index might represent the likelihood that a third-party application is migrating user transaction data (111) to a competitive financial service or a competitive financial application. Such a third-party application might be an extension to financial application (109) developed using tools from a software development kit (SDK) made available by financial service (104).

In one or more embodiments, financial service (104) might use data repository (105) to store a table (113) with action scores for third-party applications. In one or more embodiments, such a table might be similar to the table (113) shown in FIG. 3. The table (113) includes columns for the name of the third-application, an action score associated with the third-party application, a globally unique identifier (GUID) for a user of the financial service (104), and an identifier for the license used to access the financial application (109). In a typical use case, a third-party application being used for competitive migration might use a relatively large number of unique commands written in Structured Query Language (SQL) to read the user transaction data (111). In another typical use case, a third-party application being used for competitive migration might use a continuous read or a bulk data extraction of the user transaction data (111) maintained for a user identified by a GUID during a single login session. Upon detecting such behavior, financial service (104) might increase or decrease an action score, which, in turn, might be used to predict the predicted risk index (112) for the third-party application. In one or more embodiments, the action score might be a counter and each read operation (e.g., using SQL) might increment the action score and each write operation (e.g., using SQL) might decrement the action score.

In one or more embodiments, financial service (104) might also use data repository (105) to store algorithms such as a risk predictor (115), which might be used to predict the predicted risk (112). In one or more embodiments, the risk predictor (115) might learn using a binomial or multinomial classifier (e.g., based on logistic regression, naïve Bayes, random forests, etc.) trained on monitored operations for known migration applications, e.g., continuous reads, bulk data extractions, a relatively large number of unique commands written in Structured Query Language (SQL), etc. Such a classifier might be based on the Scikit-learn library. In one or more embodiments, the risk predictor (115) might learn using clustering functionality, e.g., a clustering algorithm based on the Scikit-learn library. In one or more embodiments, the risk predictor (115) might learn using deep learning neural networks, e.g., the TensorFlow library. The risk predictor (115) might run on the server computing devices for the financial services (104), along with the financial application (109) and the distributed computing software (110), e.g., HADOOP®, HADOOP® YARN, etc., described above.

Figure 2A:
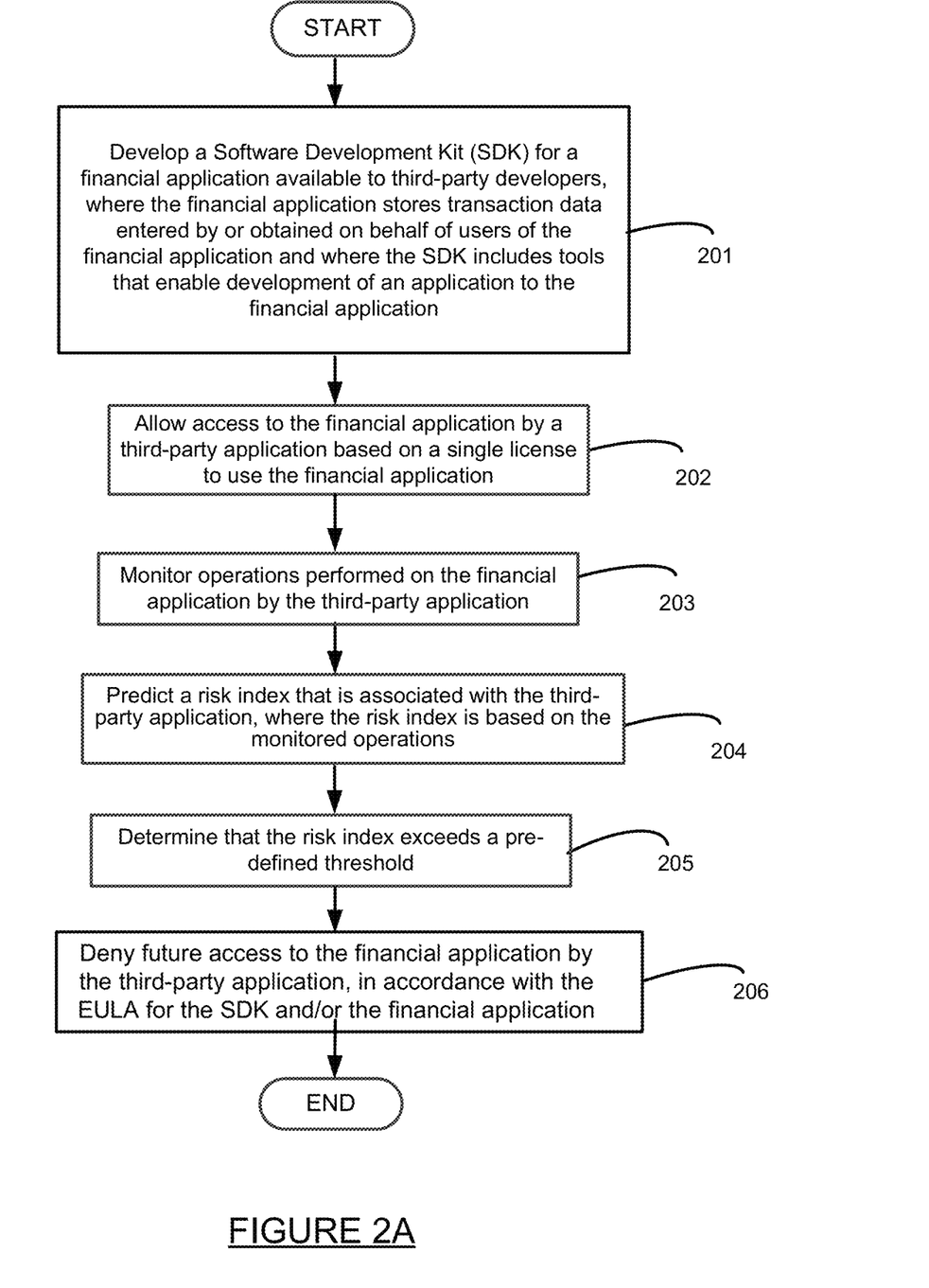
FIG. 2A is a flowchart diagram of a process for determining that a third-party application poses a risk of migrating user transaction data, in accordance with one or more embodiments.

FIG. 2A is a flowchart diagram of a process for determining that a third-party application poses a risk of migrating user transaction data, in accordance with one or more embodiments. In one or more embodiments, the operations shown in this figure might be performed by software running on servers at financial service (104) using data repository (105) In one or more embodiments, one or more of the operations shown in this figure might be performed on clustered computers running distributed-computing software that supports batch processing based on a Map-Reduce architecture (e.g., HADOOP®). In one or more embodiments, one or more of the operations shown in this figure might be performed on clustered computers running distributed-computing software that supports stream processing based on a Map-Reduce architecture (e.g., HADOOP® YARN architecture). In one or more embodiments, all or some of the operations shown in this figure might be performed by software (e.g., a client application including, for example, a webpage with embedded JAVASCRIPT® scripting language program code or ACTIONSCRIPT® scripting language program code) running on a client device (e.g., user computing device X (102) or user computing device Y (103)).

While the various operations in this flowchart and the flowcharts below are presented and described sequentially, one of ordinary skill will appreciate that some or all of the operations may be executed in different orders, may be combined or omitted, and some or all of the operations may be executed in parallel. Furthermore, the operations may be performed actively or passively. For example, some operations may be performed using polling or be interrupt-driven in accordance with one or more embodiments of the invention. By way of an example, determination operations may not require a processor to process an instruction unless an interrupt is received to signify that a condition exists, in accordance with one or more embodiments of the invention. As another example, determination operations may be performed by performing a test, such as checking a data value to test whether the value is consistent with the tested condition, in accordance with one or more embodiments of the invention.

As depicted in FIG. 2A, the financial service (104)) develops a software development kit (SDK) for a financial application available to third-party developers, in operation 201. In one or more embodiments, the financial application stores transaction data entered by or obtained on behalf of users of the financial application. In one or more embodiments, the SDK includes tools that enable development of an extension to the financial application. In operation 202, the financial service (104) allows access to the financial application by a third-party application. In one or more embodiments, the third-party application might have only a single license to use the financial application. In operation 203, the financial service (104) monitors operations performed on the financial application by the third-party application. As indicated above, a third-party application might use operations such as a continuous reads, a bulk data extraction, or a relatively large number of unique commands written in Structured Query Language (SQL), to migrate a user's transaction data to a competitive application.

In operation 204, the financial service (104) calculates a risk index that is associated with the third-party application. In one or more embodiments, the risk index might be based on the monitored operations. In one or more embodiments, there might be multiple action scores for a particular third-party application, where each action score is associated with a different GUID and/or a different login session. In one or more embodiments, the risk index might be predicted by risk predictor (115), using the action scores as inputs. In operation 205, the financial service (104) determines that the risk index exceeds a pre-defined threshold, e.g., as determined by an average of the risk indices for known migration applications. Then in operation 206, the financial service (104) denies future access to the financial application by the third-party application, in accordance with the EULA for the SDK and/or the EULA for the financial application. In one or more embodiments, this operation might involve blacklisting the third-party application using its name as shown in the table with action scores (113). It will be appreciated that such a blacklisting would prevent access by the third-party application under a new license.

Figure 2B:
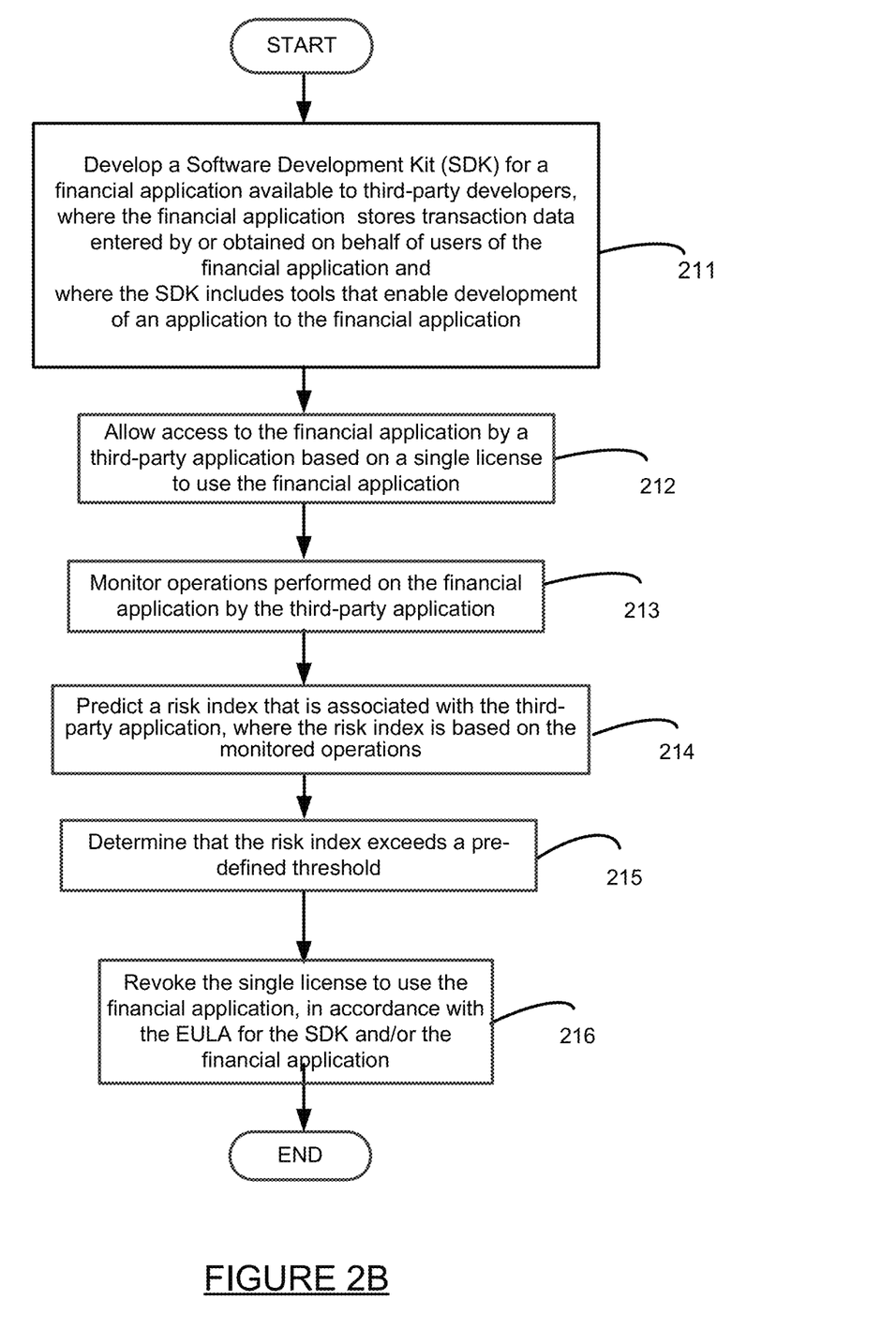
FIG. 2B is flowchart diagram of another process for determining that a third-party application poses a risk of migrating user transaction data, in accordance with one or more embodiments.

FIG. 2B is a flowchart diagram of another process for determining that a third-party application poses a risk of migrating user transaction data, in accordance with one or more embodiments. In one or more embodiments, the operations shown in this figure might be performed by software running on servers at financial service (104) using data repository (105) In one or more embodiments, one or more of the operations shown in this figure might be performed on clustered computers running distributed-computing software that supports batch processing based on a Map-Reduce architecture (e.g., HADOOP®). In one or more embodiments, one or more of the operations shown in this figure might be performed on clustered computers running distributed-computing software that supports stream processing based on a Map-Reduce architecture (e.g., HADOOP® YARN architecture). In one or more embodiments, all or some of the operations shown in this figure might be performed by software (e.g., a client application including, for example, a webpage with embedded JAVASCRIPT® scripting language program code or ACTIONSCRIPT® scripting language program code) running on a client device (e.g., user computing device X (102) or user computing device Y (103)).

As depicted in FIG. 2B, the financial service (104)) develops a software development kit (SDK) for a financial application available to third-party developers, in operation 211. In one or more embodiments, the financial application stores transaction data entered by or obtained on behalf of users of the financial application. In one or more embodiments, the SDK includes tools that enable development of an extension to the financial application. In operation 212, the financial service (104) allows access to the financial application by a third-party application. In one or more embodiments, the third-party application might have only a single license to use the financial application. In operation 213, the financial service (104) monitors operations performed on the financial application by the third-party application. As indicated above, a third-party application might use operations such as a continuous reads, a bulk data extraction, or a relatively large number of unique commands written in Structured Query Language (SQL), to migrate a user's transaction data to a competitive application.

In operation 214, the financial service (104) calculates a risk index that is associated with the third-party application. In one or more embodiments, there might be multiple action scores for a particular third-party application, where each action score is associated with a different GUID and/or a different login session. In one or more embodiments, the risk index might be predicted by risk predictor (115), using the action scores as inputs, along with other inputs such as the number of GUID changes (e.g., a relatively large number of GUID changes using a single license indicates that the third-party application might be migrating user transaction data) and/or the number of license changes (e.g., a relatively large number of license changes indicates that the third-party application might be migrating user transaction data). In operation 215, the financial service (104) determines that the risk index exceeds a pre-defined threshold, e.g., as determined by an average of the risk indices for known migration applications. Then in operation 216, the financial service (104) revokes the single license to use the financial application, in accordance with the EULA for the SDK and/or the EULA for the financial application.

Figure 2C:
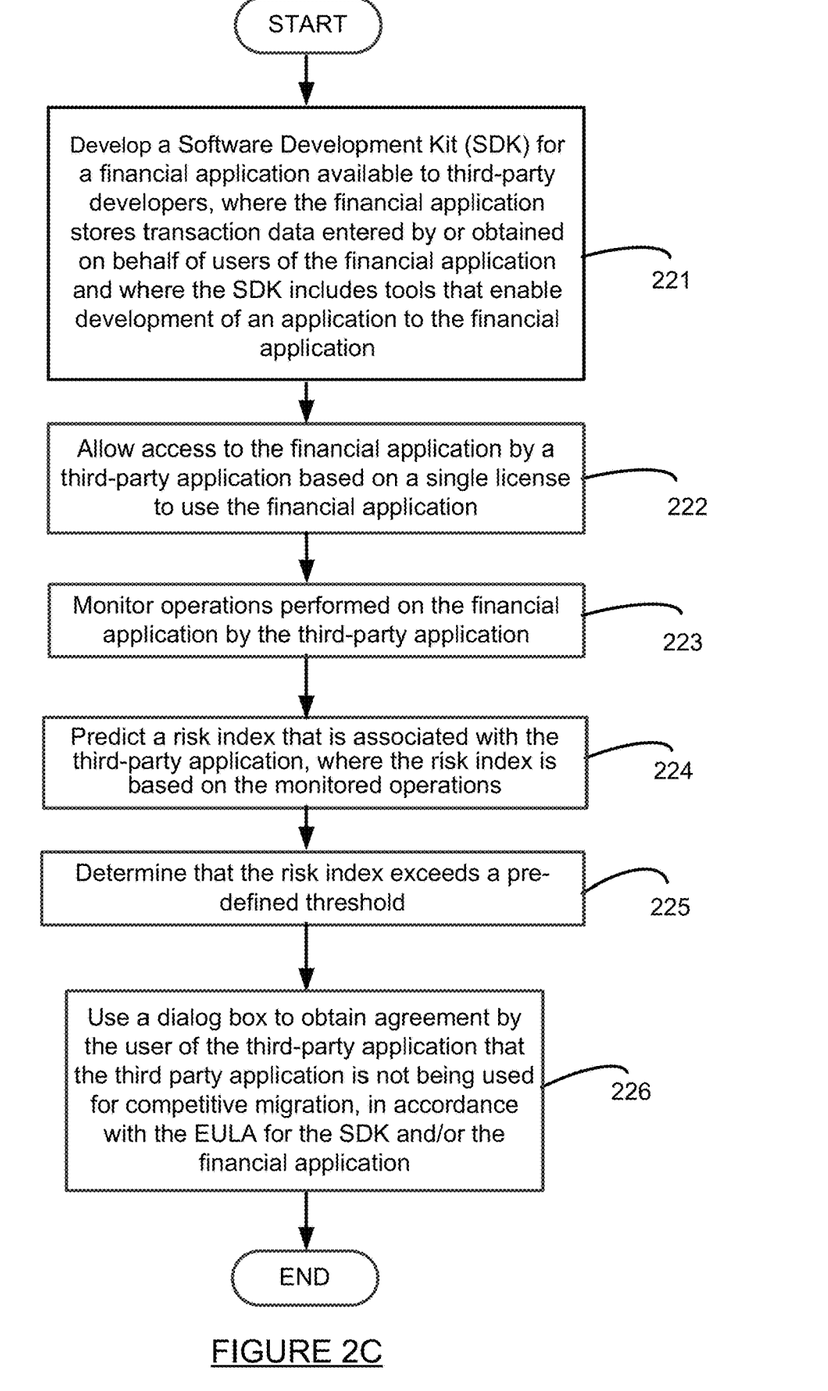
FIG. 2C is flowchart diagram of yet another process for determining that a third-party application poses a risk of migrating user transaction data, in accordance with one or more embodiments.

FIG. 2C is a flowchart diagram of yet another process for determining that a third-party application poses a risk of migrating user transaction data, in accordance with one or more embodiments. In one or more embodiments, the operations shown in this figure might be performed by software running on servers at financial service (104) using data repository (105) In one or more embodiments, one or more of the operations shown in this figure might be performed on clustered computers running distributed-computing software that supports batch processing based on a Map-Reduce architecture (e.g., HADOOP®). In one or more embodiments, one or more of the operations shown in this figure might be performed on clustered computers running distributed-computing software that supports stream processing based on a Map-Reduce architecture (e.g., HADOOP® YARN architecture). In one or more embodiments, all or some of the operations shown in this figure might be performed by software (e.g., a client application including, for example, a webpage with embedded JAVASCRIPT® scripting language program code or ACTIONSCRIPT® scripting language program code) running on a client device (e.g., user computing device X (102) or user computing device Y (103)).

As depicted in FIG. 2C, the financial service (104)) develops a software development kit (SDK) for a financial application available to third-party developers, in operation 221. In one or more embodiments, the financial application stores transaction data entered by or obtained on behalf of users of the financial application. In one or more embodiments, the SDK includes tools that enable development of an extension to the financial application. In operation 222, the financial service (104) allows access to the financial application by a third-party application. In one or more embodiments, the third-party application might have only a single license to use the financial application. In operation 223, the financial service (104) monitors operations performed on the financial application by the third-party application. As indicated above, a third-party application might use operations such as a continuous reads, a bulk data extraction, or a relatively large number of unique commands written in Structured Query Language (SQL), to migrate a user's transaction data to a competitive application. With respect to the latter measure, the SDK might make approximately 30 SQL commands available to third-party applications. If a third-party application uses all 30 of them, this is an indication that the third-party application is migrating user transaction data to a competitive financial application, since a typical third-party application only uses a few of the commands.

In operation 224, the financial service (104) calculates a risk index that is associated with the third-party application. In one or more embodiments, there might be multiple action scores for a particular third-party application, where each action score is associated with a different GUID and/or a different login session. In one or more embodiments, the risk index might be predicted by risk predictor (115), using the action scores as inputs. In operation 225, the financial service (104) determines that the risk index exceeds a pre-defined threshold, e.g., as determined by an average of the risk indices for known migration applications. Then in operation 226, the financial service (104) uses a dialog box to obtain agreement by the user of the third-party application that the third party application is not being used for competitive migration, in accordance with the EULA for the SDK and/or the EULA for the financial application. In one or more embodiments, the dialog box might be displayed by the financial application (109).

Figure 3:
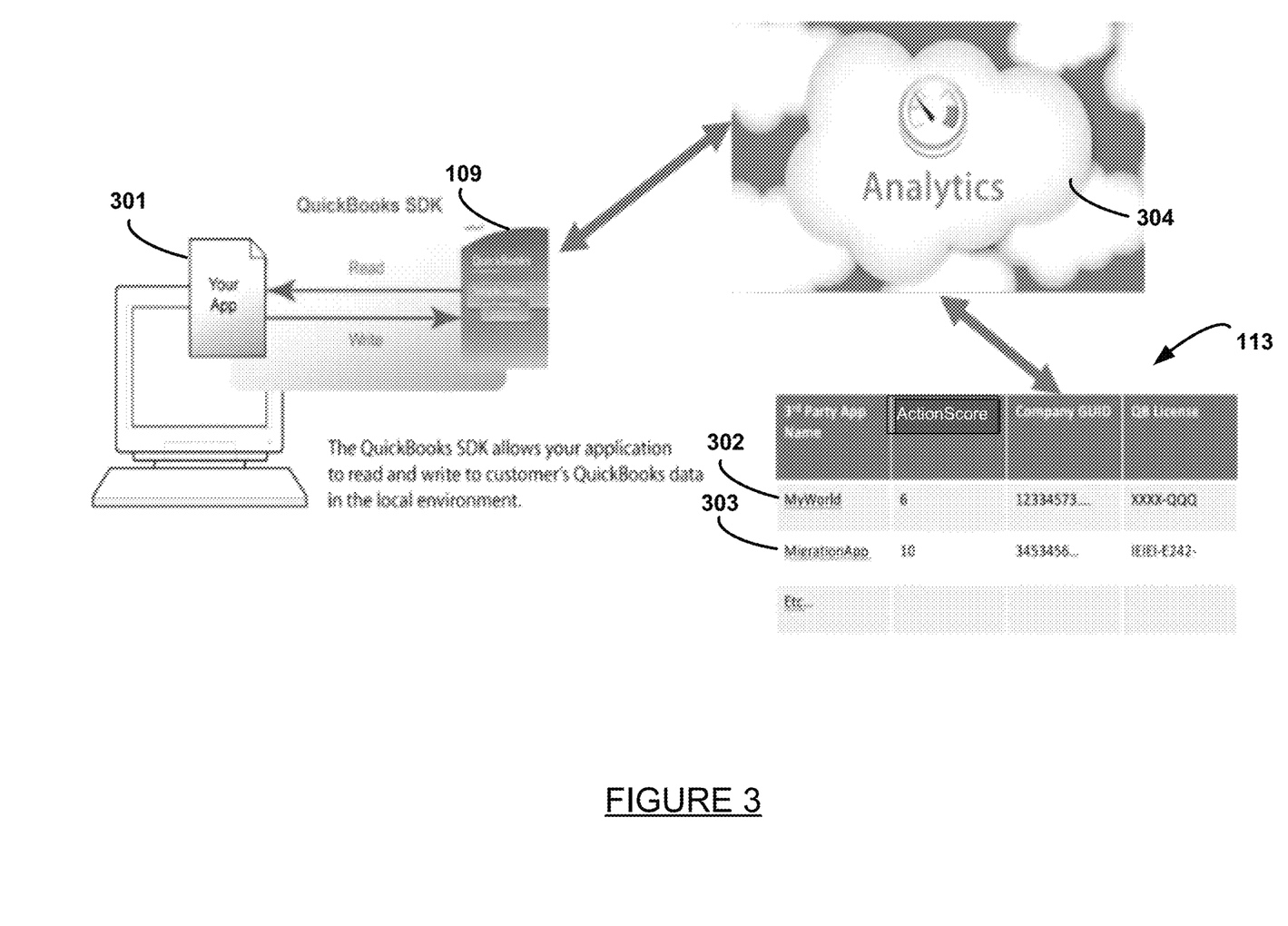
FIG. 3 shows a system for monitoring migration risk, in accordance with one or more embodiments.

FIG. 3 is a diagram showing a system for monitoring migration risk, in accordance with one or more embodiments. As depicted in this figure, a third-party application (301) uses tools in an SDK for a financial application (109) to perform read and write operations on user transaction data stored by the financial application (109). In one or more embodiments, these operations might be monitored by analytics software (304) running on cloud servers at the financial service (104). Also, in one or more embodiments, the analytics software (306) might increase or decrease action scores in a table (113), based on the monitored operations. So, for example, as shown in row (302) of table (113), if a third-party application (301) named MyWorld performs both reads and writes of user transaction data for a user (e.g., a user identified by a GUID that begins with the digits 3453456), the action score for the third-party application (301) might be decreased to 6. But if a third-party application (301) named MigrationApp performs a continuous read of the user transaction data for a user (e.g., a user identified by a GUID that begins with the digits 12334573), the action score for the third-party application (301) might be increased to 10, as shown in row (303). In one or more embodiments, the analytics software (304) might then input all of the action scores for MigrationApp that have accessed the financial application (109) using the same license (e.g., the license whose identifier is XXXX-QQQ) into risk predictor (115) and determine that the predicted risk exceeds a pre-determined threshold. Then the financial service (104) might deny further access to the financial application (109) by MigrationApp, in accordance with the EULA for the SDK and/or the EULA for the financial application (109).

The following use cases are for explanatory purposes only and not intended to limit the scope of the invention.

In a first use case, a financial service has developed a software development kit (SDK) for its stock portfolio application available to third-party developers. A third-party developer uses the SDK to create a "stock ticker" extension to the stock portfolio application. When a user (other than the third-party) runs the extension on the application using the user's license, the extension performs a continuous read of the user's transaction data. However, when another user (other than the third party) runs the extension on the application, a different license is used. When these monitored operations are input to the financial service's risk predictor, the risk predictor predicts that the extension is not being used for migrating user transaction data to a competitive financial application.

In a second use case, a financial service has developed a software development kit (SDK) for its tax application available to third-party developers. Another financial service which is a competitor uses the SDK to create a migration extension to the tax application. When an employee of the other financial service runs the extension on the tax application using a single license for multiple users of tax application, the extension performs a continuous read of each user's transaction data. When these monitored operations are input to a risk predictor, the risk predictor predicts that the extension is being used for migrating user transaction data to a competitor's financial service and the extension is denied future access to the financial application, in accordance with the EULA for the SDK and/or the EULA for the financial application.

Figure 4A:
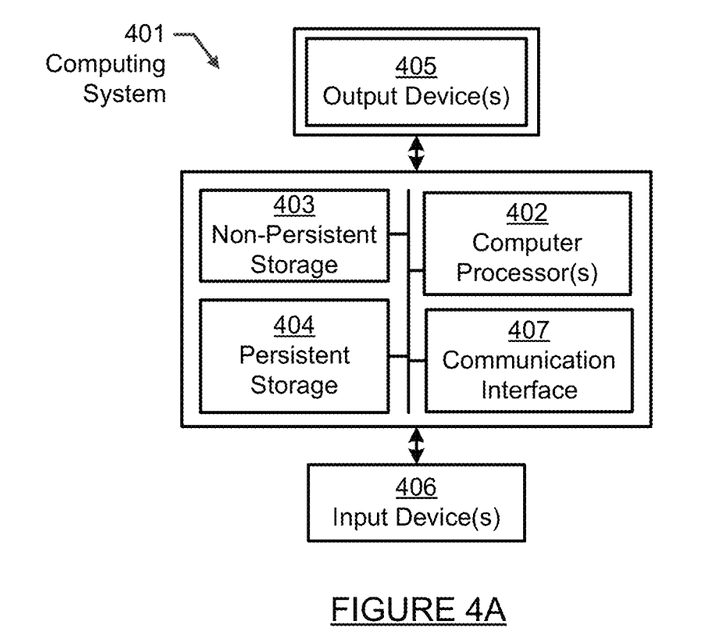
FIGS. 4A and 4B are diagrams showing a computing system, in accordance with one or more embodiments of the invention.

Embodiments of the invention, including user computing device X (102) and user computing device Y (103), may be implemented on a computing system. Any combination of mobile, desktop, server, embedded, or other types of hardware may be used. For example, as shown in FIG. 4A, the computing system (401) may include one or more computer processor(s) (402), associated memory (403) (e.g., random access memory (RAM), cache memory, flash memory, etc.), one or more storage device(s) (404) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (401) may also include one or more input device(s) (406), such as a touchscreen, keyboard, mouse, microphone, touchpad, electronic pen, or any other type of input device. Further, the computing system (401) may include one or more output device(s) (405), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (401) may be connected to a network (420) (e.g., a local area network (LAN), a wide area network (WAN) such as the Internet, mobile network, or any other type of network) via a network interface connection (not shown). The input and output device(s) may be locally or remotely (e.g., via the network (420)) connected to the computer processor(s) (402), memory (403), and storage device(s) (404). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (401) may be located at a remote location and connected to the other elements over a network (420). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 4B:
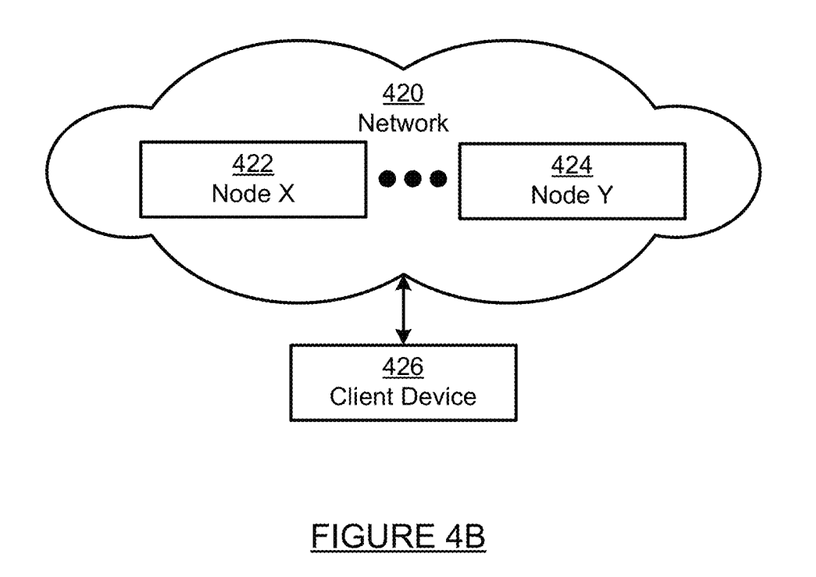

As noted above, the computing system (401) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (401) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform all or a portion of one or more embodiments of the invention.

The computing system or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 4A and the nodes and/or client device in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising operations of:
servicing, by an application, access by a third-party extension, executing on each of a plurality of devices, to the application based on a single license to use the application, wherein the third-party extension was developed by a third-party developer using one or more tools in a software development kit (SDK) for the application and wherein the application stores first transaction data obtained for a first user of the application;
monitoring operations that are performed on the application by the third-party extension to detect operations that migrate transaction data from the application to a competitive application with the third-party extension and generate a plurality of action scores for the third-party extension, wherein the monitored operations include a relatively large number of unique commands written in a structured query language (SQL);
applying a classifier to the plurality of action scores to generate a risk index with a processor that applies the classifier to the plurality of action scores,
wherein training the classifier comprises using a plurality of monitored operations, the plurality of monitored operations performed on the application, the plurality of monitored operations comprising one or more of continuous reads, bulk data extractions, and a number of unique commands written in the structured query language,
wherein the risk index measures a likelihood that the third-party application is being used to migrate transaction data to the competitive application, and
wherein software that maintains the risk index is trained on past monitored operations using unsupervised machine-learning;
using distributed computing software to adjust the risk index that is associated with the third-party extension;
determining that the risk index exceeds a pre-defined threshold; and
denying access, from the third-party extension on each of the plurality of devices using the third-party extension, to the application after determining that the risk index exceeds the pre-defined threshold.

2. The method of claim 1, wherein the application stores second transaction data obtained for a second user of the application.

3. The method of claim 2, wherein the monitored operations include a first continuous read of the first transaction data and a second continuous read of the second transaction data.

4. The method of claim 2, wherein the monitored operations include a first bulk data extraction of the first transaction data and a second bulk data extraction of the second transaction data.

5. The method of claim 1, wherein denying access includes revoking the single license to use the application.

6. A non-transitory computer-readable storage medium configured to store a program, wherein the program, when executed, performs operations to:
service, by an application, access by a third-party extension, executing on each of a plurality of devices, to the application based on a single license to use the application, wherein the third-party extension was developed by a third-party developer using one or more tools in a software development kit (SDK) for the application and wherein the application stores first transaction data obtained for a first user of the application;
monitor operations that are performed on the application by the third-party extension to detect operations that migrate transaction data from the application to a competitive application with the third-party extension and generate a plurality of action scores for the third-party extension, wherein the monitored operations include a relatively large number of unique commands written in structured query language (SQL);
apply a classifier to the plurality of action scores to generate a risk index with a processor that applies the classifier to the plurality of action scores,
wherein training the classifier comprises using a plurality of monitored operations, the plurality of monitored operations performed on the application, the plurality of monitored operations comprising one or more of continuous reads, bulk data extractions, and a number of unique commands written in the structured query language,
wherein the risk index measures a likelihood that the third-party application is being used to migrate transaction data to the competitive application, and
wherein software that maintains the risk index is trained on past monitored operations using unsupervised machine-learning;
use distributed computing software to adjust the risk index that is associated with the third-party extension, wherein the risk index is based at least in part on the monitored operations;
determine that the risk index exceeds a pre-defined threshold; and
deny access, from the third-party extension on each of the plurality of devices using the third-party extension, to the application after determining that the risk index exceeds the pre-defined threshold.

7. The non-transitory computer-readable storage medium of claim 6, wherein the application stores second transaction data obtained for a second user of the application.

8. The non-transitory computer-readable storage medium of claim 7, wherein the monitored operations include a first continuous read of the first transaction data and a second continuous read of the second transaction data.

9. The non-transitory computer-readable storage medium of claim 7, wherein the monitored operations include a first bulk data extraction of the first transaction data and a second bulk data extraction of the second transaction data.

10. The non-transitory computer-readable storage medium of claim 6, wherein denying access includes revoking the single license to use the application.

11. The non-transitory computer-readable storage medium of claim 6, wherein the unsupervised machine-learning is based at least in part on clustering techniques.

12. A system, comprising:
a hardware processor and memory;
software instructions stored in the memory and configured to execute on the hardware processor, which, when executed cause the hardware processor to:
service, by an application, access by a third-party extension, executing on each of a plurality of devices, to the application based on a single license to use the application, wherein the third-party extension was developed by a third-party developer using one or more tools in a software development kit (SDK) for the application and wherein the application stores first transaction data obtained for a first user of the application;
monitor operations that are performed on the application by the third-party extension to detect operations that migrate transaction data from the application to a competitive application with the third-party extension and generate a plurality of action scores for the third-party extension, wherein the monitored operations include a relatively large number of unique commands written in structured query language (SQL);
apply a classifier to the plurality of action scores to generate a risk index with a processor that applies the classifier to the plurality of action scores,
wherein training the classifier comprises using a plurality of monitored operations, the plurality of monitored operations performed on the application, the plurality of monitored operations comprising one or more of continuous reads, bulk data extractions, and a number of unique commands written in the structured query language,
wherein the risk index measures a likelihood that the third-party application is being used to migrate transaction data to the competitive application, and
wherein software that maintains the risk index is trained on past monitored operations using unsupervised machine-learning;
use distributed computing software to adjust the risk index that is associated with the third-party extension, wherein the risk index is based at least in part on the monitored operations;
determine that the risk index exceeds a pre-defined threshold; and
deny access, from the third-party extension on each of the plurality of devices using the third-party extension, to the application after determining that the risk index exceeds the pre-defined threshold.

* * * * *